United States Patent Office

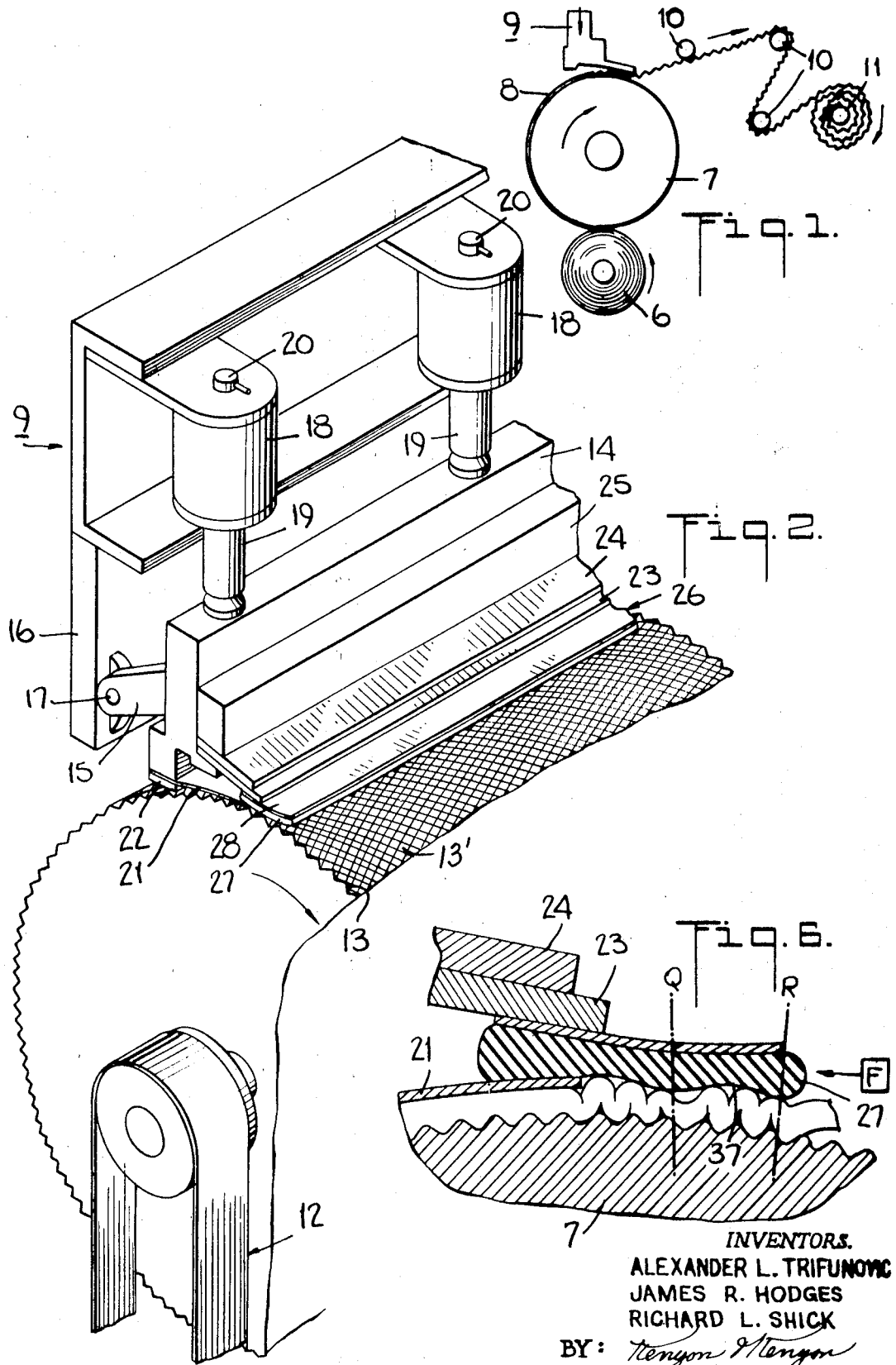

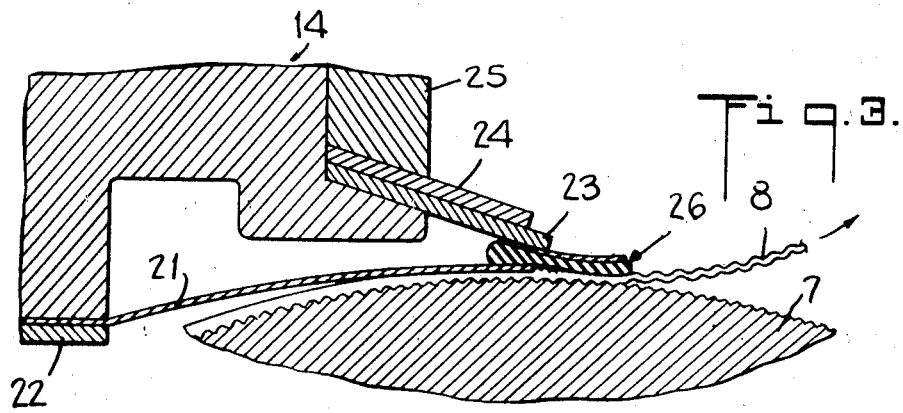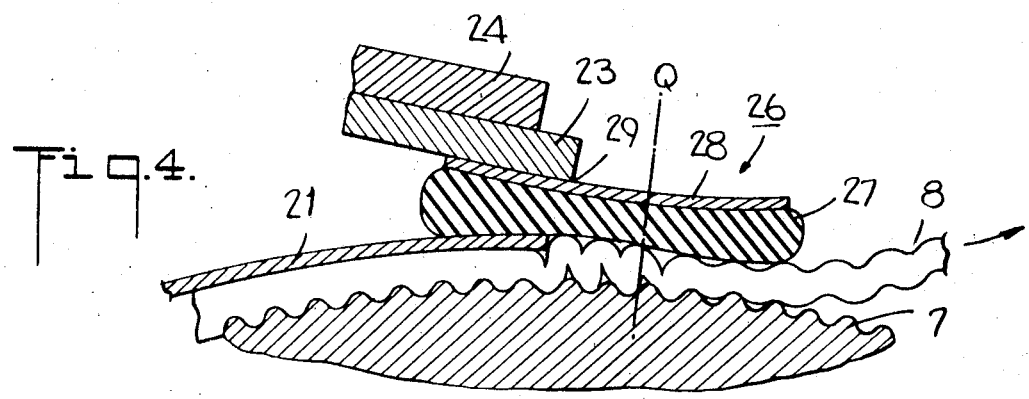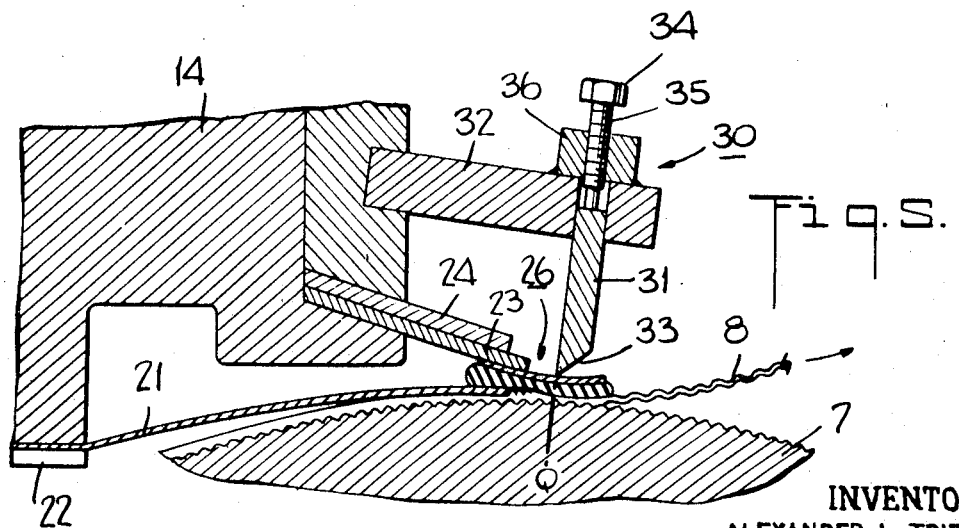

3,641,234
Patented Feb. 8, 1972

3,641,234
MECHANICAL TREATMENT OF MATERIAL
Alexander L. Trifunovic, James R. Hodges, and Richard L. Shick, Wilmington, Del., assignors to Joseph Bancroft & Sons Co., Rockford, Wilmington, Del.
Division of application Ser. No. 525,039, Feb. 4, 1966. Continuation-in-part of application Ser. No. 810,424, Jan. 13, 1969. This application Apr. 15, 1970, Ser. No. 28,217
Int. Cl. B29c 15/00; B29d 7/22
U.S. Cl. 264—282
13 Claims

ABSTRACT OF THE DISCLOSURE

The width of the advancing material is longitudinally compressed by being passed between a rotating roll and an overlying cover member. The cover member has a first plate which serves to define a first passage with the rotating roll and a second plate with a higher coefficient friction which serves to define a second passage with the rotating roll. A cavity is formed between the plates of the cover member and the rotating roll wherein the textile material is subjected to an abrupt reduction in the driving force on the material while being simultaneously confined to a thickness slightly greater than the thickness in the first passage such that the material is longitudinally compressed within the cavity.

---

This application is a division of copending application Ser. No. 525,039, now Pat. No. 3,425,409, and a continuation of application Ser. No. 810,424, filed Jan. 13, 1969.

This invention relates to a mechanical treatment of materials. More particularly, this invention relates to a mechanical treatment of materials which are capable of being longitudinally compressed. Still more particularly, this invention relates to a mechanical treatment which exerts lengthwise compressive forces upon traveling lengths of thin materials such as extile yarns and fabrics, paper, metal foil and plastic film to reduce the lengths thereof. Still more particularly this invention relates to a process and apparatus for mechanically compressing fabric materials which are capable of longitudinal compression to impart desirable characteristics thereto.

It has been known that certain materials, more especially textiles, can be subjected to mechanical treatments which produce a product having barely perceptible surface variations, if any, with a large degree of lengthwise compression, such as, disclosed in U.S. Pat. 3,066,046 issued on Nov. 27, 1962, and U.S. Pat. 3,260,778. Several of the heretofore processes have relied on the technique of delivering a traveling length of material into the nip formed by two rolls with each roll rotating at a different speed to longitudinally shrink the material under the retarding forces created by the speed variation between the rolls. Still other processes have relied on the technique of driving a length of material between a rotating roll and a resilient rubber belt, the belt being distorted from its relaxed position by the roll, in order to create a retarding force on the material to longitudinally compact the material.

One of the heretofore known treatments has utilized a method and apparatus which grips a length of material on a rotating roll and delivers the material under a spring steel plate which is spaced over the roll in order to press the material against the roll for forward movement of the material. Thereafter, the material is retarded in its forward movement by the roll, the spring steel plate and a retarder blade which is positioned in spaced relation between the roll and the spring steel plate and compacted in an expansion zone formed by the roll, the spring steel plate and retarder blade. The tip of the retarder blade is spaced from the tip of the spring steel plate with a very close tolerance in order that the essential retarding force may be developed by the blade to impart the desired longitudinal compaction of the material in the expansion zone. The spacing of the respective blade and plate is an essential feature of this process and it has been critical in obtaining the final desired state of the material processed.

It is an object of this invention to provide a novel mechanical compressive treatment for materials.

It is another object of this invention to provide a mechanical compressive treatment which prevents imperfections in the materials from interfering with the process.

It is another object of the invention to provide a mechancial compression apparatus which can be quickly and easily set up in a minimum of time.

It is another object of the invention to provide a process for mechanically compressing traveling lengths of material.

It is another object of the invention to provide a process for mechanically compressing traveling lengths of material to impart stretch and/or bulk, and/or crimped properties thereto.

It is another object of this invention to provide a process for mechanically longitudinally compressing traveling lengths of material wherein the material is first driven through a first passage where it is subjected to a driving force which advances it while maintaining its thickness and its substantially undistorted state, thereafter, the driving force on the material is abruptly reduced while the material is confined to a slightly greater thickness, and then the material is frictionally engaged in a second passage by a friction force on one side in opposition to the driving force on the other side to slow its forward movement so as to accumulate and compress it longitudinally as it advances from the first passage through the second passage.

It is another object of the invention to provide a mechanically compressed material having stretch properties and/or increased bulk and/or hand while maintaining an even surface appearance.

In general, the invention provides an apparatus for driving a stream of material through a first passage while maintaining the thickness and substantially undistorted state of the material, and thence, into a second passage wherein the material is longitudinally compressed. The second passage forms an accumulation cavity. The height of the accumulation cavity at its entrance end adjacent the first passage is greater than the height of the first passage at its most forward point. At a point spaced from the entrance end of the accumulation cavity is a point of minimum passage which has a height less than the height of the entrance to the second passage. Beyond this latter point of minimum passage which forms the exit end of the accumulation cavity the passage increases in height.

The apparatus includes a driving means and a cover member spaced from the driving means to form the passages and cavity for the conveyance of the material therethrough. The cover member is spaced from the driving means in the first passage to press the material against the driving means without substantail distortion so that as the material passes through the passage, the driving force imposed on one side of the material by the driving means is much greater than the frictional force which is developed on the other side of the material by the cover member thereby permitting advancement of the material at substantially the same speed as the driving means. In the second passage, the cover member is spaced from the driving means to develop a frictional force on one side of the material at the intermediate point of the second passage where the accumulation cavity ends which is greater than the driving force imposed on the other side of the material by the driving means so that the speed of the material is slowed and the material begins to slip with respect to the driving means and accumulate in the accumulation cavity wherein it is longitudinally compressed by the material subsequently leaving the first passage.

When in operation, the material which is longitudinally compressed in the accumulation cavity may either be extruded therefrom by the force of the advancing material driven from the first passage or withdrawn by any other suitable means. In addition, the manner of taking up the compressed material may incorporate a suitable means for removing some of the compression of the material to effect a material with a desired degree of compression within the range of the apparatus.

The contour of the second passage may be such that the entrance and exit ends of the accumulation cavity may be relatively abrupt or gradual depending on the type of material to be treated and the nature of the longitudinal compression desired in the material. Also, the length and maximum space between the cover member and driving means in the second passage may be varied depending on the material to be treated and the results desired.

Any material capable of being longitudinally compressed, such as textile materials composed of cellulosics, proteins, keratine, and synthetics and produced as, knit, woven, and non-woven fabrics can be treated in the above manner. Further, where a textile fabric material is treated in the above manner it will have its length longitudinally compressed to a fraction of its original length with the fibers of the material crowded together in such a manner that the undulations of the yarns will become almost imperceptible to the naked eye and will give the appearance of an even surface. Such fabric materials will also possess suitable qualities of stretchability, bulk, hand and uniformity.

These and other objects and advantages will become more apparent from the following detailed description and appended claims when taken in conjunction with the accompanying drawings in which:

FIG. 1 illustrates a schematic view of a mechanical compression apparatus of the invention in situ;

FIG. 2 illustrates a perspective view of a mechanical compression apparatus of the invention;

FIG. 3 illustrates a part cross-sectional view of the apparatus illustrated in FIG. 2;

FIG. 4 illustrates an enlarged part cross-sectional view of one of the preferred embodiments of the invention showing a diagrammatic relationship of a driving means and a cover member;

FIG. 5 illustrates a cross-sectional view of a modified form of the invention, and FIG. 6 illustrates a cross-sectional view of another modified form of the invention.

Referring initially to FIG. 1, a sheet material supply 6 is positioned below a driving means such as, a rotatable steel roll 7 for delivery of a sheet material 8 thereto. The sheet material 8 before delivery to the roll 7 may have been subjected to other treatments such as in the case of textile fabrics, prestretching to obtain stretch characteristics in the material in the width direction, cured or noncured resin impregnation treatments for imparting subsequent features such as permanent press or wrinkle resistant characteristics to the material, or for imparting permanent setting characteristics to the material. The roll 7, which possesses a driving surface which may vary from relatively smooth to highly roughened depending upon the material, grips the material and delivers the material under the cover member 9.

The cover member 9 and roll 7 cooperate to form successive passages for the sheet material 8 wherein the sheet material is first pressed against and forwarded by the roll 7 and thereafter subjected to a distorsional shear force on the top surface thereof which causes the material 8 to slip with respect to the roll 7 thereby slowing down the forward movement of the material 8 relative to the roll 7. This effects an accumulation of the material within the advanced passage of the cover member 9 which imparts a longitudinal compression to the material, as described below. After being longitudinally compressed, the material is taken up through a series of guide rollers 10 which are arranged apart from the roller 7 to guide the material to a suitable take-up means 11. The take-up means 11 and guide rollers 10 are operated at a speed less than the speed of the roller 7 to take up the material in its longitudinally compressed state while maintaining the degree of longitudinal compression therein. Depending on the desired longitudinal compression for the material within the range of longitudinal compression of the apparatus, the speed of the guide rollers and take-up means can be set to draw out or remove some of the longitudinal compression in the treated material. The longitudinally compressed sheet material 8 can then be subjected to any further treatment which is suitable therefor, for example, permanent setting thereof.

Referring to FIG. 2, the roll 7 is provided with a suitable drive means 12, such as, a belt drive which drives the roll in the direction indicated by the arrow thereon. Depending upon the material being treated, the surface of the roll may or may not be roughened to obtain the proper driving force, which facilitates treatment of the material.

The roll 7 may also be heated interiorly by any suitable means to a suitable treatment temperature. The roll 7 provides a uniform temperature across the width of the material being treated thereby minimizing any problem in differential expansion of the heat expandable components therearound and facilitating the uniform treatment of a material. The roll 7 also provides the driving force which is necessary to drive the material into the passages formed between it and the cover member 9.

The cover member 9 is provided with a shoe apparatus 14 which is pivotally mounted by suitable support arms 15 to a stationary support block 16 to rotate about an axis defined by pivot pins 17 on the support block 16. The shoe apparatus 14 is actuated through a press means composed of a plurality of air cylinders 18 mounted on the support block 16. Each air cylinder 18 has a piston rod 19 which presses against the shoe apparatus 14 and an adjustment device 20 for varying the force applied through the piston rod to the shoe apparatus 14.

Referring to FIG. 3, the shoe apparatus 14 has a first material contacting means comprising a flexible steel plate 21 mounted on the bottom thereof by means of a holder 22. The plate 21 extends outwardly from the shoe apparatus in a cantilevered manner over the roll 7 to form a first passage therewith.

The shoe apparatus 14 also mounts a pair of suitable pressure plates 23, 24 thereon in an inclined position designed to apply pressure to the free end portion of the plate 21. The pressure plates 23, 24 which are preferably of steel are secured on the shoe apparatus 14 by a suitable clamp means 25 which is removably secured to the shoe apparatus 14 in any suitable manner.

In addition, the shoe apparatus 14 has a second material contacting means 26 which is secured between the pressure plates 23, 24 and plate 21 and extends outwardly of the plate 21 to form a second passage with the drive roll 7. The second material contacting means 26 has a material contacting surface which is composed of a material having a relatively higher coefficient of friction than the first material contacting plate 21. The flexibility and resiliency of member 26 depends on the type of material being processed and the results desired. The member 26 is positioned in overlapping contact with the plate 21 under the edge of the pressure plate 23 with its free end extending beyond the free end of plate 21. The lower free edge 29 of lower pressure plate 23 may be located a slight distance in from the vertically projected edge of the plate 21 or in a more advanced position depending on the characteristics of member 26 and the ability to make it deflect towards the drive roll 7 as more fully explained below.

The operation of the equipment is discussed below, by way of example in relation to the treatment of a 2-bar 40 denier 13 filament nylon warp knit fabric which was 54 inches wide and had a yield of 6.3 ounces per yard prior to treatment.

In the equipment used, the drive roll 7 was 10⅝ inches in diameter and its surface had knurls 13 spaced 125 to the inch at an angle of 53° to the direction of rotation of the roll. A second series of cross knurls 13' shown in FIG. 2 spaced 125 to the inch were superimposed on the roll at a slightly shallower depth to prevent the fabric 8 from tending to advance in the direction of the deeper knurls 13. The surface of the roll was chrome plated and had a roughness reading (RMS) of between 180 to 220.

The first material contacting means 21 was comprised of a .006 inch thick flexible Invar steel plate. The second material contacting means 26 shown in detail in FIG. 4 comprised a strip of silicone rubber 27 having a rubber Durometer of 45 secured under a flexible steel plate 28. The free edge 29 of pressure plate 23 was in contact with the top surface of the flexible steel plate and resilient strip of silicone rubber 27 at a point located about .01 inch in from the vertically projected free edge of the plate 21. Because of its disposition, the rubber strip 27 cushions and distributes the application of the applied force of the pressure much in the manner of a shock absorber.

In operation, the fabric 8 was placed on and around the drive roll 7 so that a sufficient length of material was placed below the shoe apparatus 14 before the shoe apparatus was lowered into position. The shoe apparatus was then lowered relative to the roll 7 so that the curvilinear plane of the bottom surface of the plate 21 was brought to bear on the fabric 8 and the forward portion of the rubber strip 27 was resting on the fabric 8 on roll 7. The air pressure in each of 4 cylinders spaced equally across the fabric was set at 720 pounds force per cylinder. The temperature of the roll 7 was brought to 225° F. and the surface speed of the roll was set at 12½ yards per minute. The surface speed of the roll corresponds to the input speed of the fabric neglecting any slight losses due to friction. The output speed of the guide rollers 10 and take-up roller 11 was set to take up the fabric at approximately 10 yards per minute so as to effect a 20% longitudinal compression of the material. It is noted that the longitudinal compression of the fabric on the take-up roller 11 will be equal to or less than the longitudinal compression imparted to the material by the cover member 9 and driving roll 7.

It was observed that once the treatment process had been initiated with the roll 7 driving the fabric and take-up roller taking it up, the forward edge of the member 26 flexed away from the roll depending upon the angle at which the fabric was withdrawn from under member 27. However, the rubber strip 27 continued to be deflected towards the roll 7 under the normal force created by the cylinders 4 so that at some intermediate plane thereof, the rubber strip 27 formed a point of minimum passage with the roll 7. As the roll 7 and take-up roller 11 continued to rotate, the fabric was advanced into the passage between the plate 21 and roll 7; the plate 21 pressing the fabric against the roll 7 due to the force effected by the cylinders 4 acting through the pressure plates 24 and 23 causing the fabric to be driven forward at substantially the same surface speed of roll 7. As the fabric proceeded forwardly of the plate 21, it passed into the accumulation cavity formed by the roll 7, the edge surface of the plate 21 and an intermediate portion of the rubber strip 27 to the point of minimum passage with the roll 7 indicated as Q in the drawings.

Upon entering the accumulation cavity, the fabric 8 initially increased in thickness while being simultaneously longitudinally compressed since the forward portions of the fabric had been subjected to a distortional shear force which caused the forward movement of the fabric to be slowed. The distortional shear force was created by the driving force of the roll 7 on the underside of the fabric 8 and the frictional drag force of the rubber strip 27 on the topside of the fabric in opposition to the driving force. The frictional drag force was sufficiently greater than the driving force to effect a slowing down of the forward movement relative to the drive roll 7 so that the fabric 8 slipped with respect to the roll 7. The slowing down of the fabric 8 relative to the roll 7 imposed a longitudinal compressive force on the fabric created by the fabric being driven into the accumulation cavity.

As the fabric 8 proceeded through the accumulation cavity, under the force of the advancing material behind it, its thickness was slightly reduced in conformance with the profile of the cavity while remaining under the force imposed on its topside by the cylinders 4 acting through the plate 28 and rubber strip 27. Any rough spots present in the fabric during this time only momentarily and locally distorted the rubber strip 27 without affecting the tolerances in the overall apparatus. The fabric was withdrawn from the accumulation cavity under the point of minimum passage. The guide rolls 10 were arranged in a series of three rolls which were set at a speed less than the speed of the drive roll 7 but at a slightly greater speed than the output speed of the longitudinally compressed fabric so that they cooperated to draw out some of the longitudinal compression in the fabric to a desired uniform degree of longitudinal compression within the range of the apparatus before the fabric was taken up by the take-up roller 11.

The longitudinally compressed fabric was subsequently heat set at a rate of about 30 y.p.m. on a tenter frame of about 10 yards in length at a temperature of approximately 340° F. applied for about 15 seconds. An examination of the fabric showed it to have increased bulk, a better hand, and more elastic stretch; the individual filaments in the yarn itself exhibiting crimps.

It appears that where there is noticeable wear in a resilient member of rubber that a higher abrasion resiliency rubber or rubber substitute or a resilient abrasion lining on the rubber member may be used without affecting the process.

Further, while rubber was used as the second material contacting means in the example described above it will be readily apparent that other materials can be substituted so long as there remains the proper shear frictional force applied to the top side of the material in relationship to the surface of the drive roll. Further, while a member that is both resilient and flexible may be suitable in treating some material, it may be desirable to use a more rigid member for other applications or when different effects are desired in the material to be treated.

Still further, by suitable adjustments to the dimensions of the accumulation cavity a coarse crepe can be obtained. In the case of woven fabrics, this will show up as a visual crepe on the surface of tht fabric.

Also, while the cover member described in the preferred embodiments above were assembled from several different parts, it will be readily apparent that the cover member can be formed from one mold so long as it has the same characteristics as described above.

Referring to FIG. 5, an alternative form of the treatment apparatus utilizes an auxiliary pressure applying means, such as a lip loader 30 which applies additional pressure on the steel plate 28 and member 27 at a point approximating the point of minimum passage Q. This form has been found to be especially useful in connection with longitudinally compressing less resilient material such as woven fabrics.

The lip loader 30, by way of example, comprises a suitable pressure plate 31 mounted on the clamp 25 by a suitable bracket 32 and having an inclined forward edge 33, the tip of which abuts the plate 26 at a point slightly spaced from the free end of the pressure plate 23. The lip loader 30 also includes a press means 34 which consists of a threaded screw 35 mounted above and in pressure applying contact with the pressure plate 31. The screw 35 is maintained in position by a suitable threaded collar 36 which permits sufficient pressure forces to be created on the pressure plate 31.

The lip loader 30 is dimensioned to extend across the width of the material being treated and the number of press means 34 are designed to be hand adjustable to provide a uniform pressure distribution across the material width.

Referring to FIG. 6, it has also been found that when the second material contacting means 26 is made of a material such as silicone rubber that by directing an auxiliary pressure applying means F against the free edge surface thereof so as to longitudinally buckle the member a second cavity 37 is formed between the point of minimum passage Q and the point R at which the auxiliary pressure applying means is directed which is also a point of minimum passage. The second cavity which is thus formed is larger than the accumulation cavity and while not restraining the material in the same manner as the accumulation cavity permits the superimposition of a wrinkle type crepe to certain longitudinally compressed material such as a woven fabric. A woven fabric which is processed in this manner will have the advantage of a substantial stretch characteristic which is not found in other wrinkle type crepe fabrics.

It has been found that by subjecting materials to the above mechanical treatment that the compression of the material is effected to desirable degrees within a minimum of time and at a rapid output speed. The treatment apparatus has been found to be effective in decreasing the amount of set-up time heretofore necessary in other apparatus, principally because in most cases there are not only less parts to contend with but also the tolerances to be maintained between a number of relatively spaced components are less critical. In fact, it has been found that only a matter of minutes is required to set up the apparatus of the invention, since, once the components of the pressure applying means have been secured together, the only mechanical adjustment which is necessary for proper operation is the positioning of the first material contacting means relative to the drive roll. Further, when the second material contacting means is made of resilient friction material, such as rubber, the amount of expansion therein due to the high temperatures used does not become critical in effecting its spacing from the driving means. Therefore, it becomes unnecessary to constantly check the spacing between the driving member and the second material contacting means with the result that the output of treated material is increased.

Also, when the second material contacting means is rubber the leading edge of the first material contacting plate can be imperfect, that is, it may have nicks or a slight warp. Additionally, where a material may have an imperfection such as a rough spot, the inherent resiliency of the member 27 will compensate for it locally and not permit the imperfection to throw off the tolerances in the apparatus. Hence, no time will be lost in shutting down a machine to reorient the tolerances which have been affected by an imperfection. Further, the speed of the apparatus can be increased over the heretofore limited speeds of other apparatus without affecting the uniformity of treatment.

The invention provides an apparatus and method for imparting longitudinal compression to traveling lengths of material in a rapid and economical fashion. The apparatus utilizes a minimum of parts in an arrangement which eliminates the need for spatially related retarder blades heretofore believed essential and thus achieves, at least, a two-fold accomplishment. That is, the apparatus can be set-up in a minimum of time since there is only one relative movement necessary to properly position the parts of the apparatus for processing operations. Also, the imposed tolerances between components can be readily observed and maintained during operations with the result that increased output or operating time is obtained.

Having thus described the invention, it is not intended that it be so limited as various changes can be readily made therein. Accordingly, it is intended that the subject matter above described and illustrated in the drawings be interpreted as illustrative and not in a limiting sense.

What is claimed is:

1. A process for mechanically compacting a material of predetermined thickness comprising the steps of
    driving a length of the material under a driving force while confining the material to maintain the predetermined thickness and substantially undistorted state of the material
    thereafter driving the length of material under said driving force into an accumulation cavity having a first clearance therein greater than the predetermined thickness of the material and an outlet of a clearance less than said first clearance; and
    frictionally engaging the material being advanced through the accumulation cavity on one side of the material with a surface of a stationary member throughout the accumulation cavity to impose a friction force thereon in a direction substantially opposite to the direction in which the material is advanced for slowing the forward movement of the material to increase the thickness of the material upon being advanced into the cavity and to accumulate and compress the material longitudinally within the cavity as the material is advanced through the cavity while simultaneously supporting the material on the opposite side on a moving member throughout the accumulation cavity.

2. A process as set forth in claim 1 wherein the material is driven into the accumulation cavity from a first passage contiguous to the accumulation cavity and of a clearance to maintain the predetermined thickness and the substantially undistorted state of the material, the first passage and the accumulation cavity defining a continuous confined passageway for the driven material.

3. A process as set forth in claim 2 wherein the clearance of the inlet of the accumulation cavity is abruptly greater than the clearance of the first passage.

4. A process as set forth in claim 1 which further comprises the step of releasing the compressed material advanced beyond the outlet of the accumulation cavity from being frictionally engaged as the material advances out of the outlet of the accumulation cavity in a mechanically compressed state.

5. A process in accordance with claim 4 in which the step of substantially releasing the material advanced beyond the outlet of the accumulation cavity being frictionally engaged comprises taking up the material in an unconfined condition as the one side thereof is advanced free of the friction forces.

6. A process in accordance with claim 1 in which the step of frictionally engaging the material being advanced through the accumulation cavity comprises contacting the one side of the material with a surface which is resiliently flexible with respect to the movable member on the other side, the resilient flexing of the surface enabling the material to be accumulated and compressed within the accumulation cavity.

7. A process as set forth in claim 1 which further comprises the step of applying an additional uniform pressure normal to said one side of the material in said accumulation cavity to increase said friction force.

8. A process as set forth in claim 1 which further comprises the step of superimposing a wrinkle type crepe to the longitudinally compressed material within said second passage.

9. A process as set forth in claim 1 wherein the stationary member is pressed in the direction of the moving member to create said friction force on the advancing material.

10. A process as set forth in claim 1 wherein said first clearance is at the inlet to the accumulation cavity and is abruptly greater than the predetermined thickness of the material.

11. A process for mechanically compacting a material of predetermined thickness comprising the steps of driving a length of the material under a driving force while confining the material in a first passage to maintain the predetermined thickness and substantially undistorted state of the material;

thereafter driving the length of material under said driving force into an accumulation cavity forming a continuous confined passageway with the first passage, said cavity having an inlet of a predetermined clearance greater than the predetermined thickness of the material and an outlet of a predetermined clearance less than the predetermined clearance of the inlet; and frictionally engaging the material being advanced through the accumulation cavity on one side of the material with a surface of a resilient member throughout the accumulation cavity to impose a friction force thereon in a direction substantially opposite to the direction in which the material is advanced for slowing the forward movement of the material to increase the thickness of the material upon being advanced into the cavity and to accumulate and compress the material longitudinally within the cavity as the material is advanced through the cavity while simultaneously supporting the material on the opposite side of a moving member throughout the accumulation cavity while said resilient member is pressed in the direction of the moving member to create said friction force on the advancing material.

12. The process for mechanically longitudinally compressing an advancing length of material of predetermined thickness comprising the steps of (1) delivering the length of material forward into a first passage at a first continuous speed, (2) subjecting the material in said first passage to a driving force imposed on one side thereof for advancing the material while maintaining the predetermined thickness and the substantially undistorted state of the material, (3) abruptly increasing the thickness of the material in a second passage immediately as the material leaves said first passage at a point contiguous to said first passage while simultaneously confining the material to a thickness slightly greater than the predetermined thickness and maintaining the imposition of said driving force on said one side thereof, and then (4) frictionally engaging the confined advancing material in said second passage with a stationary friction force on a side opposite said one side thereof in opposition to said driving force simultaneously imposed on said one side for slowing the forward movement of the confined material while simultaneously reducing the slightly greater thickness of the material from said point of abrupt increase to accumulate and to compress the material longitudinally as the material advances from said first passage through said second passage.

13. A process for mechanically longitudinally compressing an advancing length of material of predetermined thickness comprising the steps of:

driving the material through a first passage with a driving force on only one side thereof at a first speed while maintaining the predetermined thickness and substantially undistorted state of the material, abruptly reducing the speed of the material by passing the material into a second passage forming a continuous confined passageway with the first passage while confining the material to a thickness slightly greater than the predetermined thickness immediately as the material leaves said first passage at a point contiguous to said first passage, and thereupon simultaneously applying increased friction force against the opposite side of the confined advancing material under a resilient confining force applied against the advancing material in opposition to said driving force upon the material passing into and through said second passage while maintaining said driving force on said one side of the material as the material passes through said second passage and while simultaneously reducing the slightly greater thickness of the material to accumulate and compress the material longitudinally as the material passes through said second passage.

References Cited

UNITED STATES PATENTS

| | | | |
|---|---|---|---|
| 3,015,145 | 1/1962 | Cohn | 26—18.6 |
| 3,220,056 | 11/1965 | Walton | 264—282 X |
| 3,235,933 | 2/1966 | Catallo | 264—282 |
| 3,260,778 | 7/1966 | Walton | 264—282 |
| 3,287,784 | 11/1966 | Loftin | 26—18.6 X |
| 3,390,218 | 6/1968 | Painter | 264—282 |
| 3,426,405 | 2/1969 | Walton | 26—18.6 X |

ROBERT F. WHITE, Primary Examiner

R. R. KUCIA, Assistant Examiner

U.S. Cl. X.R.

264—316

UNITED STATES PATENT OFFICE
Certificate

Patent No. 3,641,234                                                Patented February 8, 1972

Alexander L. Trifunovic, James R. Hodges and Richard L. Shick

Application having been made by Alexander L. Trifunovic, James R. Hodges, and Richard L. Shick, the inventors named in the patent above identified, and Joseph Bancroft & Sons Co., Wilmington, Delaware, a corporation of Delaware, the assignee, for the issuance of a certificate under the provisions of Title 35, Section 256, of the United States Code, adding the names of BenjaminE. Mann and Ick W. Kim as joint inventors, and deleting the names of Alexander L. Trifunovic and James R. Hodges as joint inventors, and a showing and proof of facts satisfying the requirements of the said section having been submitted, it is this 15th day of May 1973, certified that the names of the said Benjamin E. Mann and Ick W. Kim are hereby added to, and that the names of the said Alexander L. Trifunovic and James R. Hodges are hereby deleted from, the said patent as joint inventors with the said Richard L. Shick.

FRED W. SHERLING
*Associate Solicitor.*

UNITED STATES PATENT OFFICE
CERTIFICATE OF CORRECTION

Patent No. 3,641,234      Dated February 8, 1972

Inventor(s) Alexander L. Trifunovic et al

It is certified that error appears in the above-identified patent and that said Letters Patent are hereby corrected as shown below:

Column 1, line 39, "extile" should be --textile--

Column 3, line 65, "roungened" should be --roughened--

Column 6, line 57, "tht" should be --the--

Signed and sealed this 19th day of March 1974.

(SEAL)
Attest:

EDWARD M. FLETCHER, JR.      C. MARSHALL DANN
Attesting Officer      Commissioner of Patents